L. J. DIEHL.
Bee-Hives.

No. 145,634.

Patented Dec. 16, 1873.

Witnesses.
C. F. Brown
M. Church

Inventor
L. J. Diehl.
by his Attys.
Hill & Ellsworth

UNITED STATES PATENT OFFICE.

LEANDER J. DIEHL, OF BUTLER, INDIANA.

IMPROVEMENT IN BEE-HIVES.

Specification forming part of Letters Patent No. 145,634, dated December 16, 1873; application filed May 17, 1873.

*To all whom it may concern:*

Be it known that I, LEANDER J. DIEHL, of Butler, in the county of De Kalb and State of Indiana, have invented a new and useful Improvement in Bee-Hives; and I do hereby declare the following to be a full and exact description of the same, reference being had to the accompanying drawings forming part of this specification, in which—

Figure 1:
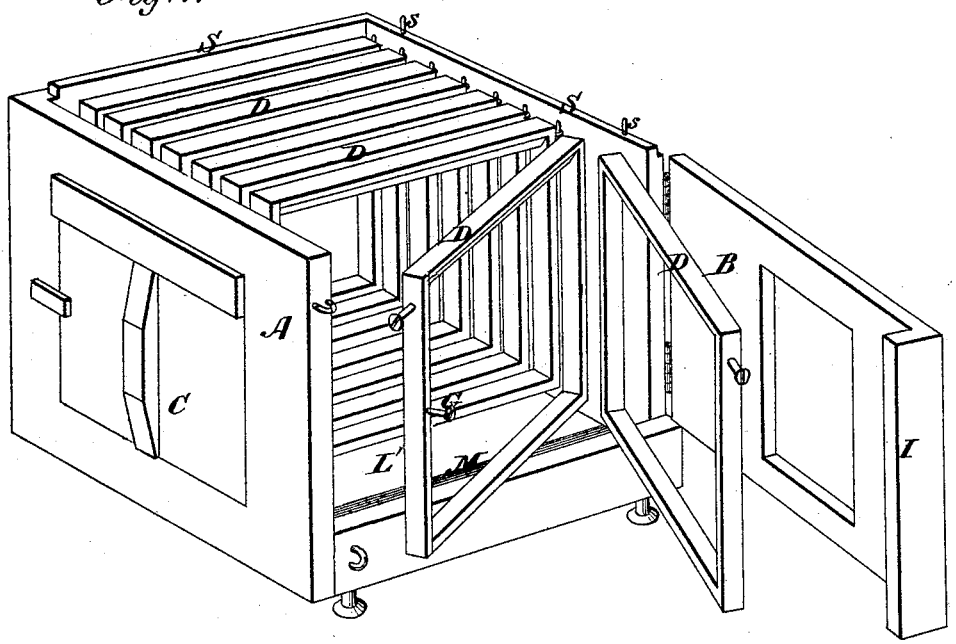
Figure 2:
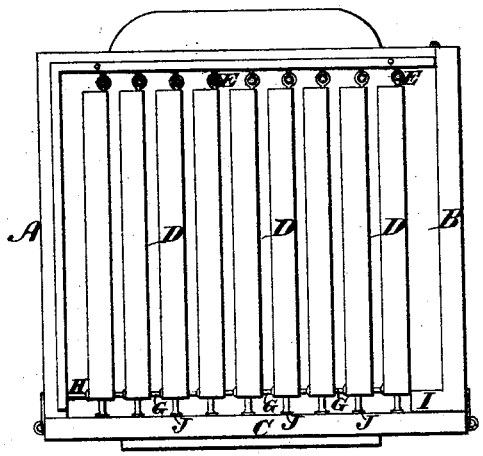

Figure 1 is a perspective view of the hive with the top removed. Fig. 2 is a plan view of the same, and Fig. 3 a sectional elevation of the entire hive.

Similar letters of reference in the accompanying drawings denote the same parts.

My invention relates to improvements in that class of bee-hives in which hinged comb-frames are used; and consists in the application to such bee-hives of devices hereinafter more fully set forth.

Figure 3:
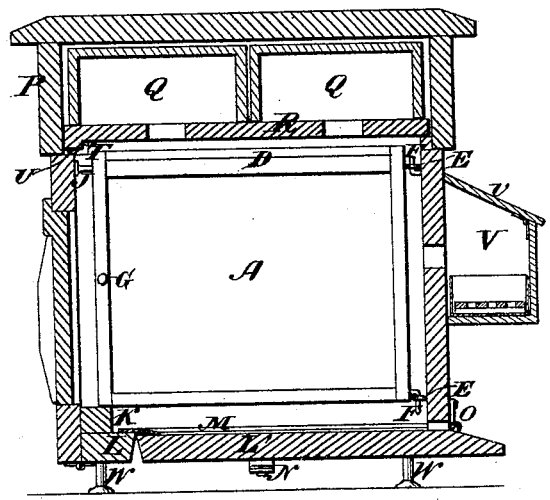

In the drawings, A represents the body of the hive, the same being a square box having two of its sides, B C, hinged so as to be swung open. D D represent a series of comb-frames, of the usual form, hinged to one side of the hive A, at the upper end of each frame, by means of an eye, E, which engages with a pintle, F, projecting from the hive, and at their lower ends by the reverse of this arrangement, as shown in Fig. 3. The frames D are parallel with the door B, so that when the latter is opened they can be swung outward, as shown in Fig. 1, and the eyes E and pintles F of each frame are attached near the outer corner, in order to prevent the corners from crushing any bees that happen to be on the side of the hive when the frames are swung outward. Each of the frames D, except the outer one, is provided on one side of its swinging end with a screw, G, or other suitable projection, which, when the frames are all in place, keeps their free ends separated, as shown in Fig. 2. A similar screw, H, projects from one side of the hive and keeps the inner frame from swinging too far. The door B is provided on its outer edge with an inwardly-projecting flange, I, which bears against the outer frame D when the door is closed, and confines all the frames, as shown in Fig. 2. At the outer end of each frame is a screw, J, the latter bearing against the side of the hive.

K represents a ledge on the bottom of the hive, on which the outer ends of the frames rest, and are thereby prevented from sagging. The bottom L is provided with a trap-door, L', arranged to swing downward when it is desired to clean the hive. The upper surface of the trap is slightly depressed below the remaining portion of the bottom, and its edges are covered by strips of sheet metal, M, fastened to the bottom and projecting over the trap, their edges being bent down to accommodate the depressed surface of said trap, yet allowing water to escape around the edges, if any collects. The trap, L' is held in place by buttons N on each side and by a hook, O, at the center in front, and is thus prevented from warping. P represents the top of the hive, and Q Q the boxes, the latter resting on the honey-board R, and the former on the upper edge of the body A. A flange or lip, S, extending around two sides of the body A, is provided with two pins, s, which enter orifices in the honey-board and hold it in place. Said board is provided on the two sides opposite the lip S with a corresponding lip, T, on its lower side, this lip having knobs or tack heads U, the whole raising the board R above the frames D and leaving a space between them. V represents a box open on one side and having a slanting hinged cover, v, said box being provided in its ends with hooks, by means of which it is attached to the side of the hive, its open side being inward.

The box V contains a tin vessel, in which honey or other substance for feeding bees may be placed. Its hinged slanting cover at once allows its interior to be inspected, and sheds rain, while its hooks allow it to be attached to any part of the hive, it being only necessary to provide suitable staples or eyes for the hooks, and an orifice through the hive for the bees to gain access to the box.

The hive is mounted on legs W, the same consisting of screws or spikes, of suitable size, driven into the bottom.

It will be readily seen that by my arrangement of the hinged frames D they are held securely on all sides when in place, and adapted to be opened and inspected at any time by simply opening the door B. The bottom L is adapted to prevent the admission of moths, &c., yet allows moisture, dirt, &c., to escape; and the feeding-box, which can be attached and removed at will, affords convenient means for supplying the bees with food when necessary.

I claim as my invention—

The frames D, hinged at their corners to the hive and provided with screws G J, in combination with the flange I of the door B, and of ledge K, to prevent sagging of the comb-frames, all constructed, arranged, and operated as set forth.

LEANDER J. DIEHL.

Witnesses:
C. F. BROWN,
D. K. HAUXHURST.